(12) United States Patent
Al-Jabri et al.

(10) Patent No.: US 11,597,869 B2
(45) Date of Patent: Mar. 7, 2023

(54) MAGNETICALLY LABELED HYBRID NANOSURFACTANTS FOR OIL RESERVOIR APPLICATIONS

(71) Applicant: SAUDI ARABIAN OIL COMPANY, Dhahran (SA)

(72) Inventors: Nouf Mohammed Al-Jabri, Dammam (SA); Amr Abdel-Fattah, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/915,198

(22) Filed: Jun. 29, 2020

(65) Prior Publication Data

US 2021/0403796 A1    Dec. 30, 2021

(51) Int. Cl.
 *E21B 43/16* (2006.01)
 *C09K 8/584* (2006.01)
 *E21B 47/10* (2012.01)

(52) U.S. Cl.
 CPC .............. *C09K 8/584* (2013.01); *E21B 43/16* (2013.01); *E21B 47/10* (2013.01); *C09K 2208/10* (2013.01)

(58) Field of Classification Search
 CPC ................................ C09K 8/584; E21B 43/16
 USPC ...................................................... 166/252.4
 See application file for complete search history.

(56) References Cited

U.S. PATENT DOCUMENTS

| | | | |
|---|---|---|---|
| 2008/0003159 A1 | 1/2008 | Cheon et al. | |
| 2012/0015852 A1 | 1/2012 | Quintero et al. | |
| 2014/0076552 A1 | 3/2014 | Murphy | |
| 2014/0357534 A1* | 12/2014 | Barron | E21B 43/26 507/140 |
| 2015/0041399 A1* | 2/2015 | Tennant | C09K 8/032 210/695 |
| 2015/0231282 A1 | 8/2015 | Pozzo et al. | |
| 2015/0376493 A1* | 12/2015 | Huh | C09K 8/805 166/252.6 |
| 2016/0340569 A1 | 11/2016 | Belcher et al. | |
| 2017/0058186 A1 | 3/2017 | Oghena et al. | |

(Continued)

FOREIGN PATENT DOCUMENTS

| | | |
|---|---|---|
| CN | 106281292 A | 1/2017 |
| CN | 108659807 A | 10/2018 |

(Continued)

OTHER PUBLICATIONS

Contreras, Zarith Pachón et al., "Petroleum sulfonates preparation and evaluation for chemical enhanced oil recovery in Colombian oil fields", Dec. 1, 2014; pp. 55-73; XP055653110; Retrieved from the Internet: URL: http://www.scielo.co/pdf/ctyf/v5n5/v5n5a04.pdf (19 pages).

(Continued)

*Primary Examiner* — Zakiya W Bates
*Assistant Examiner* — Ashish K Varma
(74) *Attorney, Agent, or Firm* — Osha Bergman Watanabe & Burton LLP

(57) ABSTRACT

A hybrid nanosurfactant composition may include a core phase including a sulfonate surfactant and a first aqueous fluid, a zwitterionic surfactant encapsulating the core phase, a plurality of magnetic particles disposed in the core phase, and a second aqueous fluid in which the encapsulated core phase is suspended. The plurality of magnetic particles may be disposed in the first aqueous fluid.

30 Claims, 11 Drawing Sheets

(56) References Cited

U.S. PATENT DOCUMENTS

2018/0346798 A1\* 12/2018 Abdel-Fattah .......... E21B 43/16
2020/0024506 A1 1/2020 Trudel et al.

FOREIGN PATENT DOCUMENTS

| CN | 108686575 A | 10/2018 |
| CN | 109251741 A | 1/2019 |
| CN | 109652049 A | 4/2019 |
| CN | 110776898 A | 2/2020 |

OTHER PUBLICATIONS

Syed, Hassan Asad et al.: "Influence of lauryl betaine on aqueous solution stability, foamability and foam stability", Apr. 3, 2019; pp. 2659-2665; XP055786250; Retrieved from the Internet: URL: http://link.springer.com/article/10.1007/s13202-019-0652-7 (7 pages).

International Search Report and Written Opinion issued in Application No. PCT/US2020/044388, dated Mar. 24, 2021 (16 pages).

Ahmed, Naveed et al., "Modified double emulsion process as a new route to prepare submicron biodegradable magnetic/polycaprolactone particles for in vivo theranostics", Soft Matter, The Royal Society of Chemistry, vol. 8, 2012, pp. 2554-2564 (11 pages).

Filippousi, Maria et al., "Surfactant Effects on the Structural and Magnetic Properties of Iron Oxide Nanoparticles", The Journal of Physical Chemistry, American Chemical Society, vol. 118, 2014, pp. 16209-16217 (9 pages).

\* cited by examiner

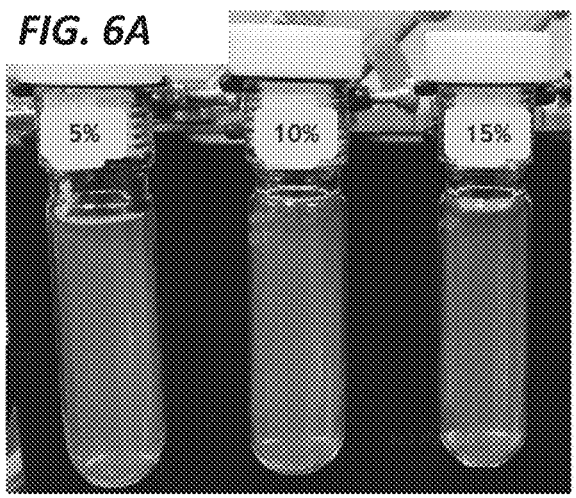
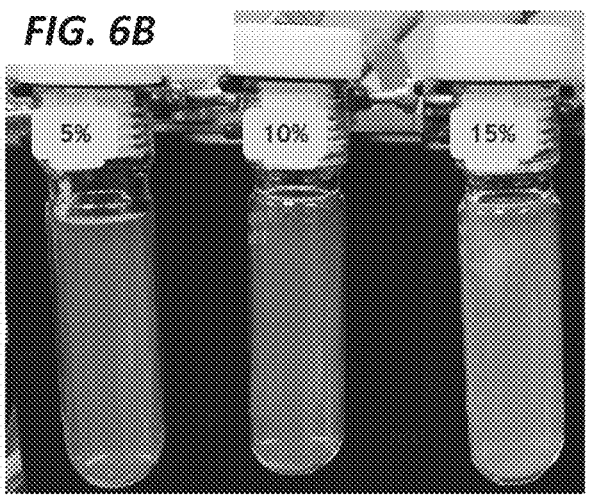
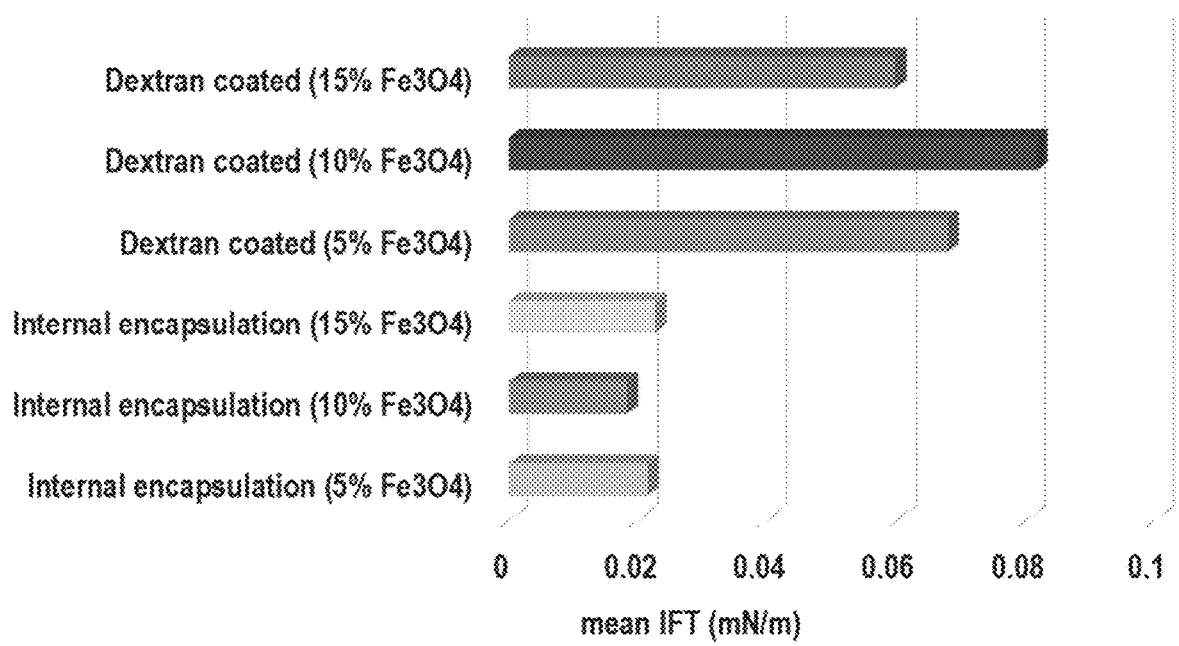
FIG. 7

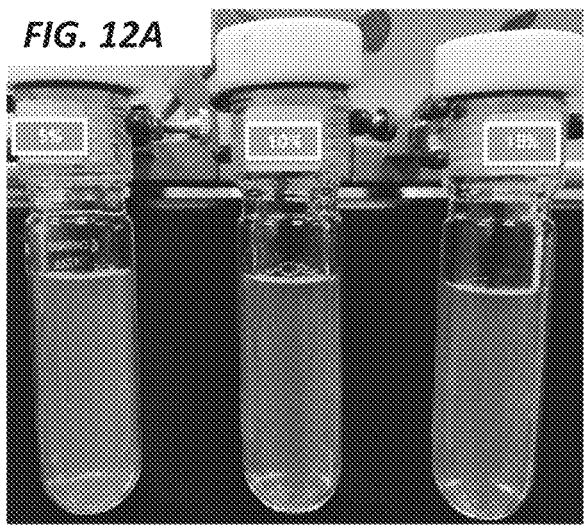 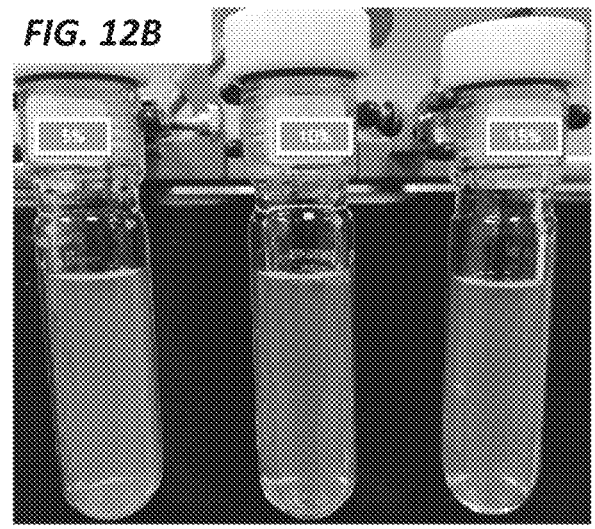

MAGNETICALLY LABELED HYBRID NANOSURFACTANTS FOR OIL RESERVOIR APPLICATIONS

BACKGROUND

Enhanced oil recovery (EOR) enables the extraction of hydrocarbon reserves that cannot be accessed by conventional primary and secondary recovery processes, such as gas or water displacement. EOR may involve the use of chemical injection techniques, which can utilize surfactants to lower the interfacial tension between the residual hydrocarbon and the injection fluid, allowing the hydrocarbon to be more readily removed. A challenging aspect of these techniques lies in efficiently delivering the surfactant to the hydrocarbon reserves, which requires avoiding degradation of the surfactant under the, possibly harsh, conditions of the reservoir in addition to limiting near-wellbore adsorption. If near-well absorption is not limited, a tremendous amount of surfactant is required to account for the amount lost before the target hydrocarbons are reached.

Moreover, effective EOR operations greatly benefit from an improved knowledge of the geological formations and the distribution of the hydrocarbon reserves therein. This can be achieved by the implementation of imaging methods, such as through the use of magnetic materials, to probe the structure of a reservoir. However, magnetic materials (such as iron oxide nanoparticles) and surfactants may have limited stability to the high temperatures and high salinity that may be present in EOR applications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein may relate to hybrid nanosurfactant compositions that include a core phase including a sulfonate surfactant and a first aqueous fluid, a zwitterionic surfactant encapsulating the core phase, a plurality of magnetic particles disposed in the core phase, and a second aqueous fluid in which the encapsulated core phase is suspended.

In another aspect, embodiments disclosed herein may relate to methods for preparing a hybrid nanosurfactant composition, the methods including mixing magnetic particles with a first portion of a first aqueous fluid to give a first mixture, adding a sulfonate surfactant to the first mixture to give a core phase solution, mixing a zwitterionic surfactant with a second portion of the first aqueous fluid to give a shell phase solution, and mixing together the core phase solution, the shell phase solution, and a second aqueous fluid.

In a further aspect, embodiments disclosed herein may relate to methods for recovering hydrocarbons from a hydrocarbon-containing formation, the methods including injecting into the formation a fluid that comprises a hybrid nanosurfactant composition that contains a sulfonate surfactant, a zwitterionic co-surfactant, and a plurality of magnetic particles, displacing hydrocarbons from the formation by forcing the fluid through the formation, and recovering the hydrocarbons.

Other aspects and advantages of the claimed subject matter will be apparent from the following description and the appended claims.

BRIEF DESCRIPTION OF THE DRAWINGS

FIGS. 6A-B depict the phase behavior of a hybrid nanosurfactant of one or more embodiments, after incubation at 90° C. for 0 days (FIG. 6A) and 39 days (FIG. 6B).

FIG. 7 depicts a graph comparing the interfacial tension of a comparative dextran coated iron oxide and a hybrid nanosurfactant of one or more embodiments of the present disclosure.

FIGS. 12A-B depict the stability of hybrid nanosurfactants of one or more embodiments in the presence of seawater, with various concentrations of iron oxide particles having a mean size of 5.0 nm (FIG. 12A) and 10.0 nm (FIG. 12B).

DETAILED DESCRIPTION

Embodiments in accordance with the present disclosure generally relate to magnetically labelled hybrid nanosurfactant (HNS) compositions that are stable under harsh reservoir conditions, such as high temperature and high salinity. This stability may be provided in one or more embodiments by the encapsulation of the active ingredients by unique techniques. In one or more embodiments of the present disclosure, the encapsulation method advantageously does not require any surface functionalization or advanced coating of the iron oxide particles, preserving their surface properties.

The HNS compositions of one or more embodiments of the present disclosure may be aqueous suspensions that comprise an aqueous fluid, two or more surfactants, and magnetic particles. In some embodiments, HNS compositions may contain two different aqueous fluids. In further embodiments, HNS compositions in accordance with the present disclosure may additionally comprise an oil.

Figure 1:
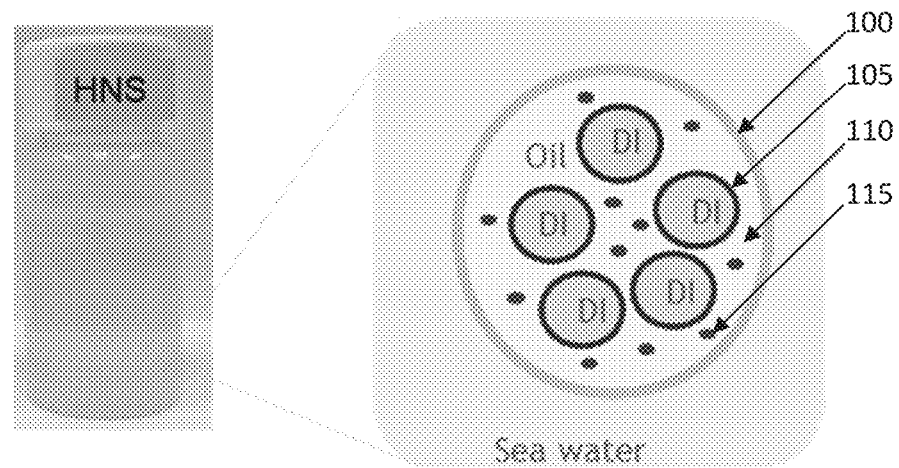
FIG. 1 depicts the structure of a hybrid nanosurfactant of one or more embodiments of the present disclosure.

As depicted by FIG. 1, HNS compositions of one or more embodiments may particularly possess a shell phase 100 that encapsulates a core phase. The shell phase may contain a zwitterionic co-surfactant. The core phase may comprise an aqueous fluid 105, a sulfonate surfactant 110, and magnetic particles 115. In FIG. 1, "DI" is used to indicate that the aqueous fluid 105 contained within the core phase of one or more embodiments may be deionized water. The core phase may further comprise a continuous oil phase, in which the aqueous fluid is dispersed. The oil phase of one or more embodiments may be provided by the sulfonate surfactant. In other embodiments, particularly those in which the surfactant does not have a sufficient oil content, additional oil may be added.

The magnetic particles of one or more embodiments may be magnetic nanoparticles. The magnetic particles may be either paramagnetic or super paramagnetic. The magnetic particles may comprise one or more of iron, cobalt, and nickel. In some embodiments, the magnetic particles may be one or more iron oxide selected from the group consisting of magnetite ($Fe_3O_4$), maghemite ($Fe_2O_3$), hematite, and combinations thereof. In some embodiments, no surface functionalization or advanced coating of the magnetic particles is needed to stabilize the magnetic particles in the HNS compositions.

The magnetic particles of one or more embodiments may be doped with a second metal. In some embodiments, the magnetic particles may be doped with one or more of the group consisting of cobalt, zinc, copper, cerium, and gadolinium. In one or more embodiments, the magnetic particles may include the dopant metal in an amount of 10 wt. % or less, 8 wt. % or less, or 5 wt. % or less.

In one or more embodiments, the magnetic particles may have an average particle size in the range of about 1 to 1000 nm. For example, the magnetic particles may have an average particle size in a range having a lower limit of any of 1, 2, 3, 4, 5, 8, 10, 15, 25, and 50 nm, and an upper limit of any of 2, 3, 5, 8, 10, 15, 25, 50, 100, 250, 500, and 1000 nm, where any lower limit can be used in combination with any mathematically-compatible upper limit. One of ordinary skill in the art will appreciate, with the benefit of this disclosure, that the size of the magnetic materials may be chosen to provide the ideal magnetic properties for a given application. In one or more embodiments, the magnetic particles may provide advantageous contrast imaging as particle aggregation is suppressed by encapsulation.

Figure 2A:
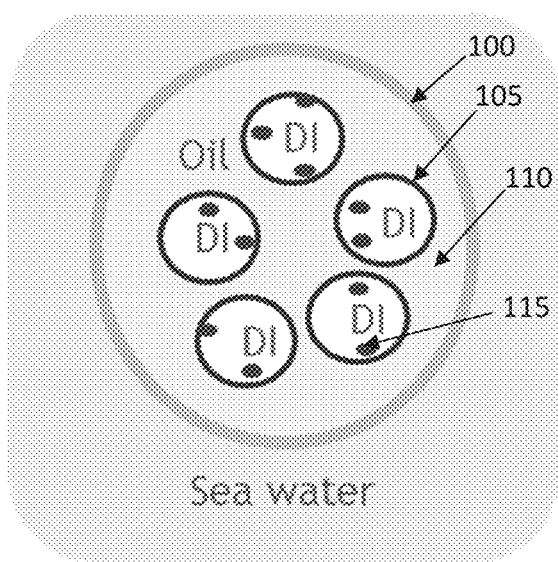
FIGS. 2A-B depict the structure of an internally encapsulated (FIG. 2A) and an externally encapsulated (FIG. 2B) hybrid nanosurfactant of one or more embodiments of the present disclosure.
Figure 2B:
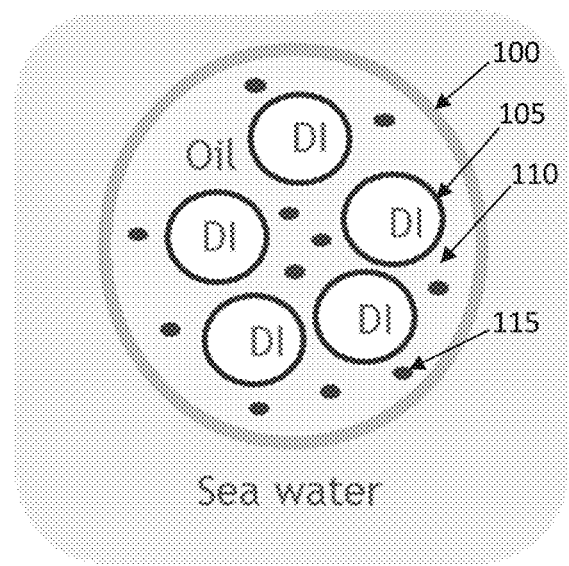

As depicted in FIGS. 2A-B, the magnetic particles of one or more embodiments may be one or more of "internally" encapsulated (FIG. 2A) and "externally" encapsulated (FIG. 2B). The internal encapsulation of one or more embodiments involves the magnetic particles 115 being contained within the internal aqueous fluid 105 of the core phase. In the external encapsulation of one or more embodiments, the magnetic particles may be dispersed in the continuous oil phase of the core phase. As discussed herein, the mode of encapsulation is dependent upon the synthetic method used for preparing a HNS composition. The magnetic particles of particular embodiments may be internally encapsulated.

The HNS compositions of one or more embodiments may contain the magnetic particles in an amount in the range of about 0.05 to 0.8% by weight (wt. %). For example, the HNS compositions may contain the magnetic particles in an amount in a range having a lower limit of any of 0.05, 0.1, 0.2, 0.3, 0.4, 0.5, 0.6 and 0.7 wt. % and an upper limit of any of 0.2, 0.3, 0.4, 0.5, 0.6, 0.7, and 0.8 wt. %, where any lower limit can be used in combination with any mathematically-compatible upper limit.

In one or more embodiments, petroleum sulfonates may be one or more of the group consisting of alkyl xylene sulfonates, alkyl aryl sulfonates, and alpha-olefin sulfonates. In one or more embodiments, the petroleum sulfonate may be a commercially-available product such as PETRONATE™ HL/L sodium sulfonate (Sonneborn LLC, NJ, USA; hereinafter "HL/L").

The sulfonate surfactant of one or more embodiments may contain one or more oil components. In some embodiments, the oil components may be mineral oil. The sulfonate surfactant of one or more embodiments may contain the oil component in an amount in the range of about 1 to 20 wt. %. For example, the sulfonate surfactant may contain the oil components in an amount ranging from a lower limit of any of 1, 2, 5, and 10 wt. % to an upper limit of any of 5, 10, 15, and 20 wt. %, where any lower limit can be used in combination with any mathematically-compatible upper limit.

The zwitterionic co-surfactants of the shell phase of one or more embodiments may possess no readily hydrolysable chemical bonds. In one or more embodiments, the zwitterionic co-surfactant may be one or more of the group consisting of sultaine surfactants, such as cocamidopropyl hydroxysultaine, and betaine surfactants, such as SURFATEX CBS™, (Surfactants International, LLC, NJ, USA); PETROSTEP® SB, PETROSTEP® CG-50, Amphosol® CG-50, (Stepan, Ill., USA); and Cola® Teric CBS-HP (Colonial Chemical Inc., TN, USA; hereinafter "CBS").

The zwitterionic co-surfactant of one or more embodiments may be selected to provide one or more of stability at high salinity and/or high temperature, a substantial reduction in hydrocarbon-seawater interfacial tension, and an ability to form an emulsion very rapidly upon contact with the hydrocarbons to be extracted.

In one or more embodiments, HNS compositions may contain each of the sulfonate surfactant and the zwitterionic co-surfactant in an amount in the range of about 0.03 to 0.8 wt. %. For example, the HNS compositions may contain each of the sulfonate surfactant and the zwitterionic co surfactant in an amount in a range having a lower limit of any of 0.03, 0.05, 0.08, 0.1, 0.2, 0.3, 0.4, 0.5, 0.6 and 0.7 wt. % and an upper limit of any of 0.1, 0.2, 0.3, 0.4, 0.5, 0.6, 0.7, and 0.8 wt. %, where any lower limit can be used in combination with any mathematically-compatible upper limit.

In or more embodiments, HNS compositions may contain both of the sulfonate surfactant and the zwitterionic co-surfactant in a total amount in the range of about 0.1 to 1.5 wt. %. For example, the HNS compositions may contain both of the sulfonate surfactant and the zwitterionic co surfactant in an total amount in a range having a lower limit of any of 0.1, 0.2, 0.3, 0.4, 0.5, 0.6 and 0.8 wt. % and an upper limit of any of 0.3, 0.4, 0.5, 0.6, 0.7, 0.8, 0.9, 1.0, and 1.5 wt. %, where any lower limit can be used in combination with any mathematically-compatible upper limit.

The HNS compositions of one or more embodiments may contain a sulfonate surfactant and a zwitterionic co-surfactant in differing amounts or in identical amounts. In one or more embodiments, the HNS composition may contain a sulfonate surfactant and a zwitterionic co-surfactant in relative amounts such that a weight ratio of the sulfonate surfactant to the zwitterionic co-surfactant is in the range of 0.3 to 3.0. For example, the HNS compositions may contain the sulfonate surfactant and the zwitterionic co-surfactant in relative amounts such that a weight ratio of the sulfonate surfactant to the zwitterionic co-surfactant is in a range having a lower limit of any of 0.3, 0.4, 0.5, 0.6, 0.7, and 0.8, and an upper limit of any of 0.7, 0.75, 0.8, 0.9, 1.0, 1.2, 1.5, 2.0, 2.5, and 3.0, where any lower limit can be used in combination with any mathematically-compatible upper limit. In particular embodiments the HNS compositions may contain the sulfonate surfactant and the zwitterionic co-surfactant in relative amounts such that a weight ratio of the sulfonate surfactant to the zwitterionic co-surfactant is in the range of 0.5 to 1.0.

The HNS compositions may contain an oil, such as mineral oil. Generally, the sulfonate surfactant will provide a sufficient amount of oil. However, in some embodiments, external oil may be added to the composition, if needed. In some embodiments, the HNS compositions may contain an oil in an amount in the range of 0.002 to 0.02 wt. %. For example, the HNS compositions may contain an oil in an amount in a range having a lower limit of any of 0.002, 0.005, 0.007, 0.01, and 0.12 wt. % and an upper limit of any of 0.007, 0.01, 0.012, 0.015, 0.017, and 0.02 wt. %, where any lower limit can be used in combination with any mathematically-compatible upper limit.

The HNS compositions of one or more embodiments of the present disclosure may comprise a first aqueous fluid that is dispersed within the core phase. The first aqueous fluid may be water that has a total dissolved solids (TDS) concentration of 5,000 ppm or less, 3,000 ppm or less, or 1,000 ppm or less. In some embodiments, the first aqueous fluid may be deionized water or freshwater. In one or more embodiments, the HNS composition may contain the first aqueous fluid and the sulfonate and zwitterionic surfactants in relative amounts such that a weight ratio of the first aqueous fluid to the total of the sulfonate and zwitterionic surfactants is in the range of 4 to 50. For example, the HNS compositions may contain the first aqueous fluid and the sulfonate and zwitterionic surfactants in relative amounts such that a weight ratio of the first aqueous fluid to the total of the sulfonate and zwitterionic surfactants is in a range having a lower limit of any of 4, 5, 8, 10, and 15, and an upper limit of any of 10, 20, 30, and 50, where any lower limit can be used in combination with any mathematically-compatible upper limit.

The HNS compositions of one or more embodiments of the present disclosure may comprise a second aqueous fluid in which the encapsulated core phase is dispersed. The second aqueous fluid may be water that has a total dissolved solids (TDS) concentration of 30,000 ppm or more, 50,000 ppm or more, 100,000 ppm or more, or 120,000 ppm or more. In some embodiments, the second aqueous fluid may be seawater or brine. Salts that may be found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In particular embodiments, brine may include an alkali metal halide or carboxylate salt and/or alkaline earth metal carboxylate salts. In one or more embodiments, the HNS composition may contain the second aqueous fluid in an amount such that the HNS composition contains the sulfonate and zwitterionic surfactants is in a desired concentration for a given application.

The HNS compositions of one or more embodiments of the present disclosure may comprise zwitterionic co-surfactant-encapsulated particles that have a diameter in the range of about 10 to 100 nm. For example, the HNS compositions may comprise zwitterionic co-surfactant-encapsulated particles that have a diameter in a range having a lower limit of any of 10, 20, 20, 40, and 50 nm, and an upper limit of any of 50, 60, 70, 80, 90, and 100 nm, where any lower limit can be used in combination with any mathematically-compatible upper limit.

The HNS compositions of one or more embodiments of the present disclosure may be thermally stable, even in the presence of a brine or seawater, at temperatures in the range of 75 to 150° C. for a duration of 3 days or more, 5 days or more, 10 days or more, 20 days or more, 30 days or more, 45 days or more, or 60 days or more. In some embodiments, the HNS compositions of one or more embodiments of the present disclosure may be thermally stable, even in the presence of a brine or seawater, at temperatures in the range of 75 to 150° C. for a duration in a range having a lower limit of 3 days or more, 5 days or more, 10 days or more, 20 days or more, 30 days or more, 45 days or more, or 60 days or more and an upper limit of 60 days or less, 90 days or less, 180 days or less, 1 year or less, or 2 years or less. The HNS compositions may, for instance, be thermally stable for the above durations at temperatures in a range having a lower limit of any of 75, 90, 100, 110, and 120° C., and an upper limit of any of 90, 100, 120, and 150° C., where any lower limit can be used in combination with any mathematically-compatible upper limit.

The HNS compositions of one or more embodiments of the present disclosure may have a mean IFT value with crude oil of 0.08 mN/m or less. In some embodiments, the HNS compositions may have a mean IFT value with crude oil of 0.06 mN/m or less, 0.04 mN/m or less, or 0.02 mN/m or less. The IFT between crude oil and a HNS compositions may be measured using a spinning drop interfacial tensiometer (M6500, Grace Instrument, TX, USA). The solution to be tested may be added to a capillary tube and a drop of filtered crude oil (such as UTMN from Uthmaniyah oil field) added. The mixture may be spun at about 4000 revolutions per minute (rpm) at 90° C. The diameter of the oil droplet may be recorded every 5 minutes for around 30 minutes and used to calculate the IFT based on the density difference between the phases, temperature, speed, and the drop diameter. The IFT is calculated in accordance with Equation (I):

$$\text{IFT (mN/m)} = 2.78 \times 10^{-16} \pi^2 / 8 n^3 (\rho_a - \rho_o) \omega D^3 \quad \text{(I)}$$

$\rho_a$=density of the aqueous phase in grams per cubic centimeters (g/cm)
$\rho_o$=density of the oil phase in grams per cubic centimeters (g/cm)
D=diameter of cylindrical droplet in micrometers
$\omega$=rotation speed (rpm)
n=refractive index of the aqueous solution Internally encapsulated HNS compositions of one or more embodiments of the present disclosure may be prepared by first adding magnetic particles to a portion of the first aqueous fluid to form a magnetic particle solution. A core phase solution may then be prepared by adding a sulfonate surfactant to the magnetic particle solution. Meanwhile, a shell phase solution may be prepared by adding a zwitterionic surfactant to a second portion of the first aqueous fluid. A portion of each of the core phase solution and the shell phase solution may be added to a second aqueous fluid. Mixing the core phase solution, shell phase solution, and second aqueous fluid together may yield the internally encapsulated HNS composition. In one or more embodiments, the aqueous fluid included in the core phase solution may be different from that included in the shell phase solution.

The magnetic particles may be added to the first aqueous fluid such that the magnetic particle solution contains the magnetic particles in an amount ranging from about 1 to 25% by weight (wt. %). For example, the magnetic particle solution may contain the magnetic particles in an amount in a range having a lower limit of any of 1, 2, 3, 4, 5, 8, 10, and 15 wt. % and an upper limit of any of 2, 3, 5, 8, 10, 15, 20, and 25 wt. %, where any lower limit can be used in combination with any mathematically-compatible upper limit.

In the preparation of internally encapsulated HNS compositions of one or more embodiments, the sulfonate surfactant may be added to the magnetic particle solution in an amount such that the core phase solution contains the sulfonate surfactant in an amount ranging from about 0.1 to 10% by weight (wt. %). For example, in a range having a lower limit of any of 0.1, 0.2, 0.3, 0.4, and 0.5 wt. %, and an upper limit of any of 0.4, 0.5, 0.6, 0.8, and 1.0 wt. %, where any lower limit can be used in combination with any mathematically-compatible upper limit.

In the preparation of internally encapsulated HNS compositions of one or more embodiments, the zwitterionic surfactant may be added to the second portion of the first aqueous fluid in an amount such that the shell phase solution contains the zwitterionic surfactant in an amount ranging from about 0.1 to 10% by weight (wt. %). For example, in a range having a lower limit of any of 0.1, 0.2, 0.3, 0.4, and 0.5 wt. %, and an upper limit of any of 0.4, 0.5, 0.6, 0.8, and 1.0 wt. %, where any lower limit can be used in combination with any mathematically-compatible upper limit.

Externally encapsulated HNS compositions of one or more embodiments of the present disclosure may be prepared by first adding magnetic particles to a portion of the first aqueous fluid to form a magnetic particle solution. A shell phase solution may then be prepared by adding a zwitterionic surfactant to the magnetic particle solution. Meanwhile, a core phase solution may be prepared by adding a second portion of the first aqueous fluid to a sulfonate surfactant. A portion of each of the core phase solution and the shell phase solution are added to a second aqueous fluid. Mixing the core phase solution, shell phase solution, and second aqueous fluid together may yield the externally encapsulated HNS composition.

In the preparation of externally encapsulated HNS compositions of one or more embodiments, the zwitterionic surfactant may be added to the magnetic particle solution in an amount such that the shell phase solution contains the zwitterionic surfactant in an amount ranging from about 0.1 to 10% by weight (wt. %). For example, in a range having a lower limit of any of 0.1, 0.2, 0.3, 0.4, and 0.5 wt. %, and an upper limit of any of 0.4, 0.5, 0.6, 0.8, and 1.0 wt. %, where any lower limit can be used in combination with any mathematically-compatible upper limit.

In the preparation of externally encapsulated HNS compositions of one or more embodiments, the sulfonate surfactant may be added to the second portion of the first aqueous fluid such that the core phase solution contains the sulfonate surfactant in an amount ranging from about 0.1 to 10% by weight (wt. %). For example, in a range having a lower limit of any of 0.1, 0.2, 0.3, 0.4, and 0.5 wt. %, and an upper limit of any of 0.4, 0.5, 0.6, 0.8, and 1.0 wt. %, where any lower limit can be used in combination with any mathematically-compatible upper limit.

One or more embodiments of the present disclosure include methods that comprise injecting the aforementioned HNS compositions into a hydrocarbon-bearing formation. As the HNS compositions of one or more embodiments contain magnetic particles, they may be used as contrast agents.

Figure 3:
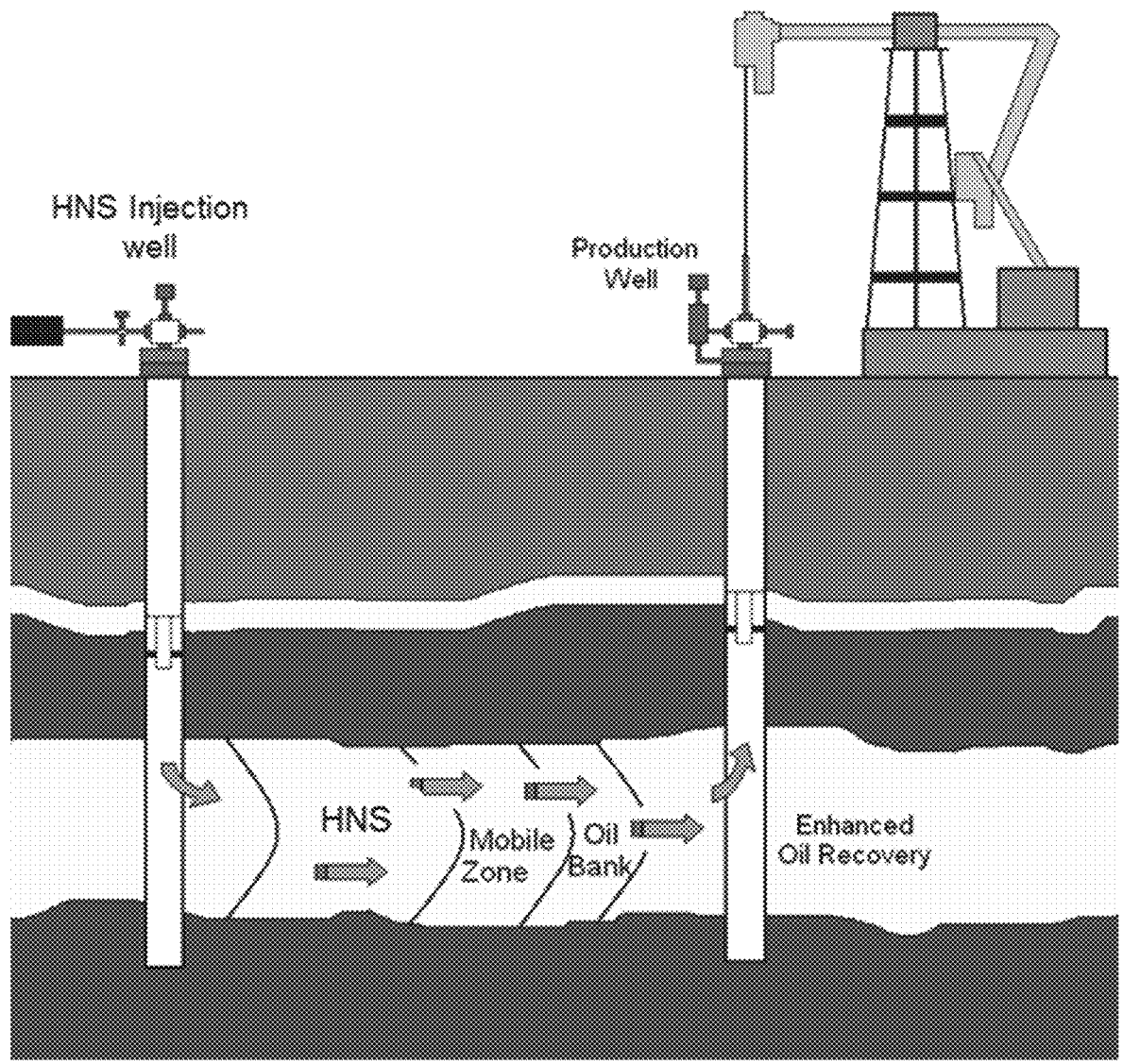
FIG. 3 is a schematic representation of a method for using the hybrid nanosurfactant of one or more embodiments in enhanced oil recovery.

The HNS compositions of one or more embodiments may be used for EOR operations (see FIG. 3). In some embodiments, a HNS composition may be injected into the hydrocarbon-bearing formation at an injection well, driven through the mobile zone of the formation, displacing hydrocarbons and increasing the hydrocarbon-saturation of the oil bank. In one or more embodiments the hydrocarbons may be recovered at a production well. In some embodiments, the recovered hydrocarbons may contain at least a portion of the HNS composition.

The HNS compositions of one or more embodiments may be used for imaging a hydrocarbon-bearing formation. In some embodiments, a HNS composition may be injected at an injection well, driven through the formation to displace hydrocarbons, and recovering the hydrocarbons at a production well. The magnetic susceptibility of the recovered oil may be measured to determine the concentration of magnetic particles that are present. In some embodiments, the HNS composition may be injected into the same formation at multiple injection wells and detected at one or more production wells. The HNS compositions of one or more embodiments may be able to detect one or more of the front of injected fluid and the mobility of the HNS composition in the formation.

EXAMPLES

The following examples are merely illustrative and should not be interpreted as limiting the scope of the present disclosure.

Effect of Encapsulation

Figure 4:
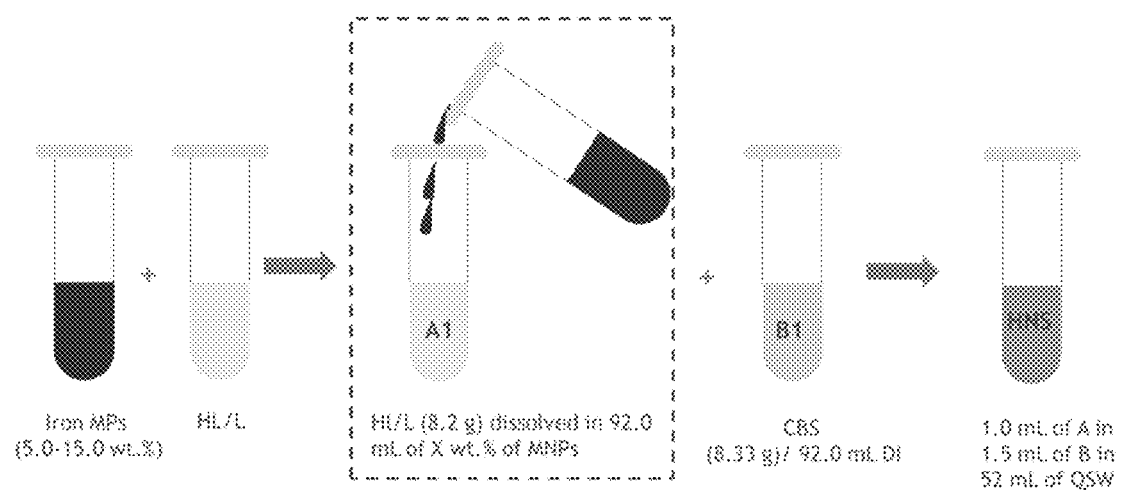
FIG. 4 is a schematic representation of the preparation of an internally encapsulated hybrid nanosurfactant of one or more embodiments.
Figure 5A:
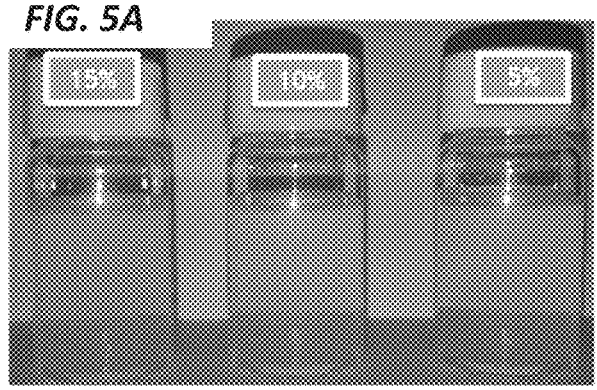
FIGS. 5A-D depict the stability of an internally encapsulated hybrid nanosurfactant of one or more embodiments, with various concentrations of iron oxide particles, at 90° C. for 0 h (FIG. 5A), 24 h (FIG. 5B), 48 h (FIG. 5C), and 72 h (FIG. 5D).
Figure 5B:
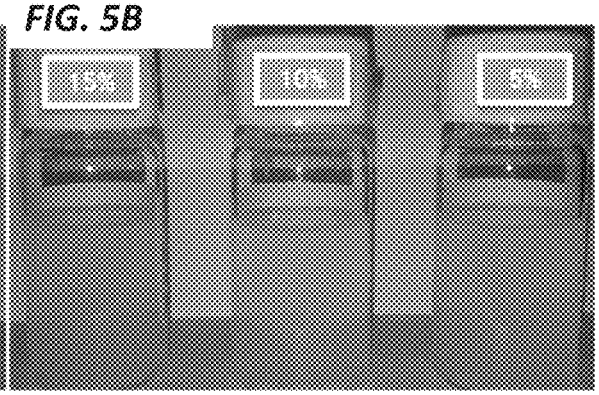
Figure 5C:
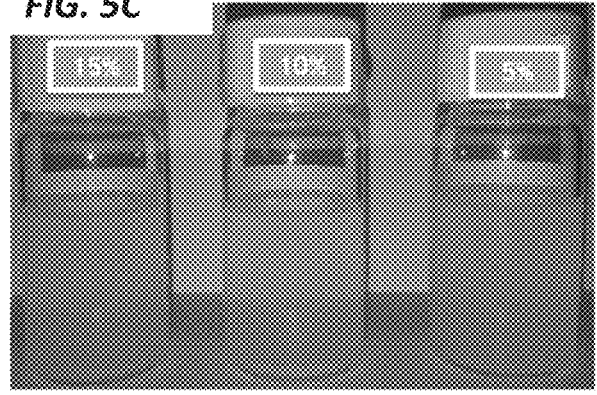
Figure 5D:
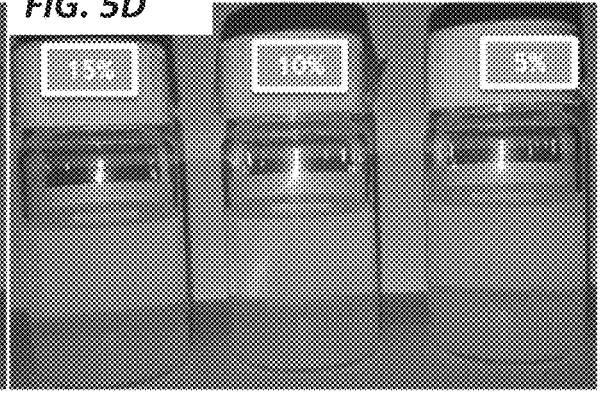
Figure 8A:
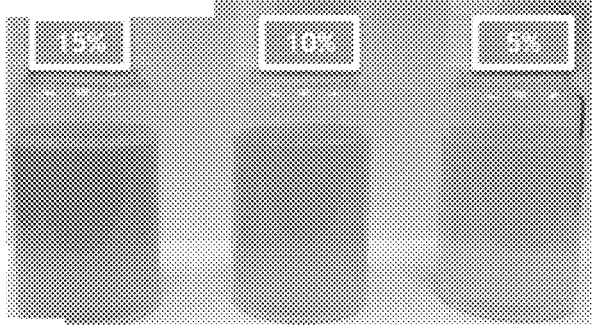
FIGS. 8A-D depict the stability of internally encapsulated comparative dextran coated iron oxide nanoparticles, with various concentrations of iron oxide particles, at 90° C. in the presence of divalent ions for 0 h (FIG. 8A), 24 h (FIG. 8B), 48 h (FIG. 8C), and 72 h (FIG. 8D).
Figure 8B:
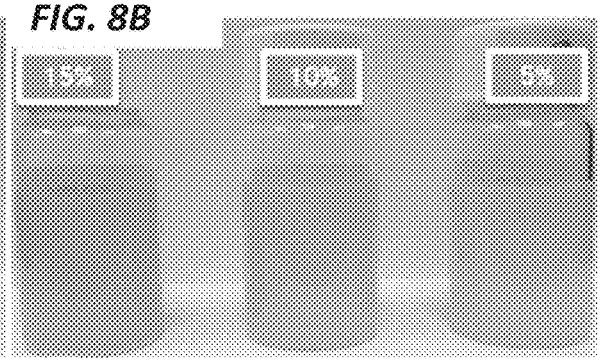
Figure 8C:
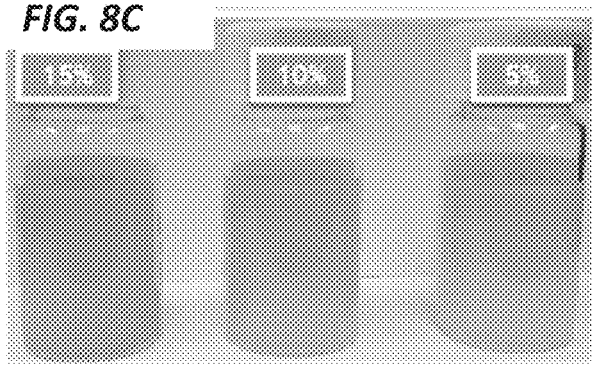
Figure 8D:
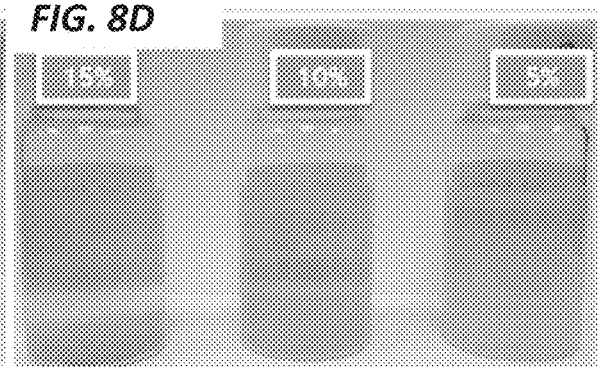
Figure 9A:
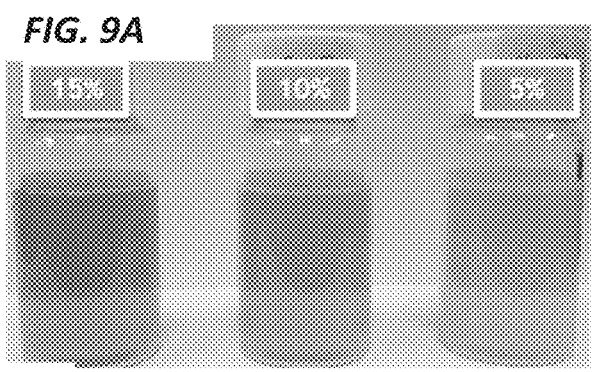
FIGS. 9A-D depict the stability of externally encapsulated comparative dextran coated iron oxide nanoparticles, with various concentrations of iron oxide particles, at 90° C. in the presence of divalent ions for 0 h (FIG. 9A), 24 h (FIG. 9B), 48 h (FIG. 9C), and 72 h (FIG. 9D).
Figure 9B:
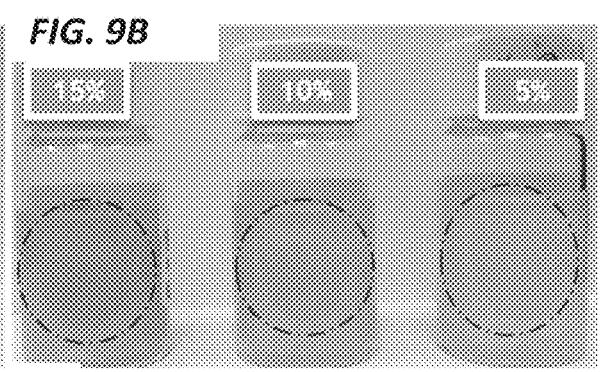
Figure 9C:
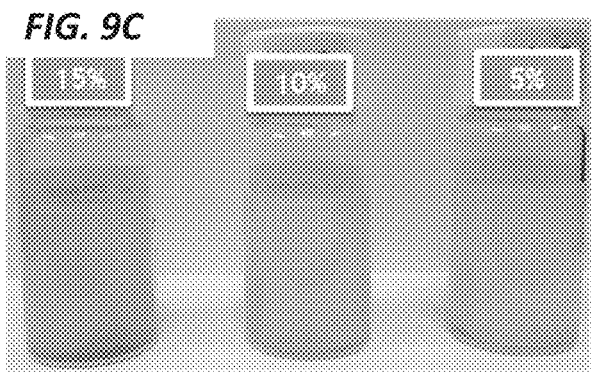
Figure 9D:
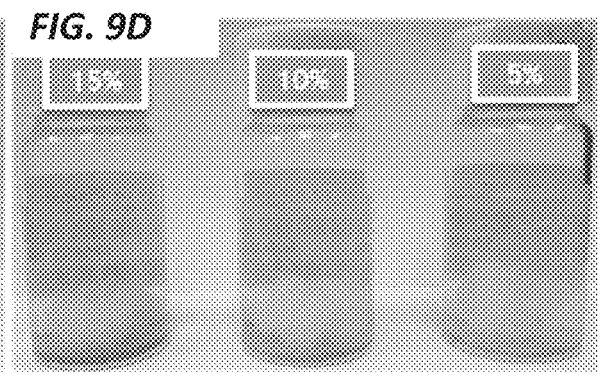

HNS synthesis was successfully completed using a straightforward protocol as depicted in FIG. 4. Three iron oxide solutions (5, 10, and 15 wt. %) were prepared in deionized water. The core phase was prepared by dissolving 8.2 g of a petroleum sulfonate (HL/L) surfactant in 92.0 mL of each of the iron oxide solutions. The shell was prepared by dissolving 8.33 g of CBS in 92.0 mL deionized water. The HNS was formulated by adding 1.0 mL of one of the core phase solutions and 1.5 mL of the shell phase solution to 52.0 mL of seawater with vigorous stirring. All of the three HNSs solutions were transferred to sealed vials for phase behavior monitoring and particle size measurements.

The stability of the HNS samples at ambient conditions in the presence of the divalent ions were evaluated and all the samples showed remarkable stability. The effect of exposure to the hot brine was evaluated by incubating all the samples at 90° C. The HNSs showed high thermal stability for three days in the presence of hot brine (FIGS. 5A-D). Due to this remarkable stability, all the samples were re-produced in pressure tubes with sealed caps to enable the duration of the phase behavior evaluation to be extended. Both the 5 and 10% HNS samples showed an exceptional colloidal stability for over a month, as shown in FIGS. 6A-B. The 15% HNS showed particle accumulation after 39 days of incubation, attributed to iron oxide particle-particle aggregation at the high particle concentration.

The interfacial tension between crude oil and each of the HNS samples was measured using a spinning drop IFT (M6500, Grace Instruments, TX, USA). The IFT measurements were conducted using UTMN oil at 90° C. with 400 rpm. The oil droplet's diameter was measured regularly every 5.0 minutes over a total duration of 30.0 minutes. All samples were incubated in an oven at 90° C. for at least 30 days before measuring the IFT.

Remarkably, each of the 5, 10, and 15% HNS samples showed low IFT values, confirming both their stability under harsh reservoir conditions and suitability for use in EOR (FIG. 7).

Iron oxide particles are commonly used with a surface functionalized by dextran and/or other naturally existed polymers. However, these materials are not stable under harsh conditions. The HNS samples are able to stabilize the supermagnetic iron oxide particles without any surface functionalization, maintaining the particles' properties. For comparison, we added the IFT of the dextran coated (commercial product) to the IFT values of HNS. The dextran coated iron oxide particles internal and external encapsulated HNS phase behavior results are shown in FIGS. 8A-D and FIGS. 9A-D. As expected, all the dextran coated materials showed high IFT values and low thermal stability at 90° C. in the presence of divalent ions.

Effect of Internal vs. External Encapsulation

Figure 10:
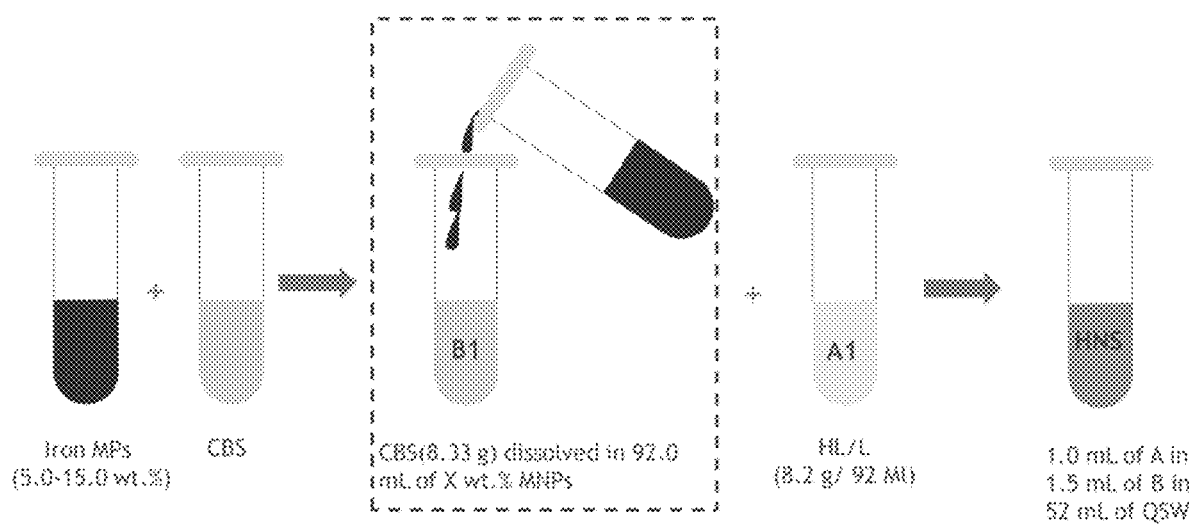
FIG. 10 is a schematic representation of the preparation of an externally encapsulated hybrid nanosurfactant of one or more embodiments.

To optimize the encapsulation efficiency, the surfactant and iron oxide particles were encapsulated in two different manners (FIG. 10). Three iron oxide solutions (5, 10, and 15%) were prepared in deionized water. The core phase was prepared by dissolving 8.2 g of HL/L surfactant in 92.0 mL of deionize water. The iron oxide phase was prepared by dissolving 8.33 g of the CBS in 92.0 mL of one of the 5, 10, and 15% iron oxide solutions. Similar to the internal encapsulation, the HNS were formulated by adding 1.0 mL of the core phase solution and 1.5 mL of the shell phase solution to 52.0 mL of sea water with vigorous stirring. All three HNS solutions were transferred to sealed vials for phase behavior monitoring and particle size measurements (FIG. 10). Under the conditions that were studied, the externally encapsulated were not colloidally stable for 24 hours.

Effect of Supermagnetic Particle Size

Figure 11A:
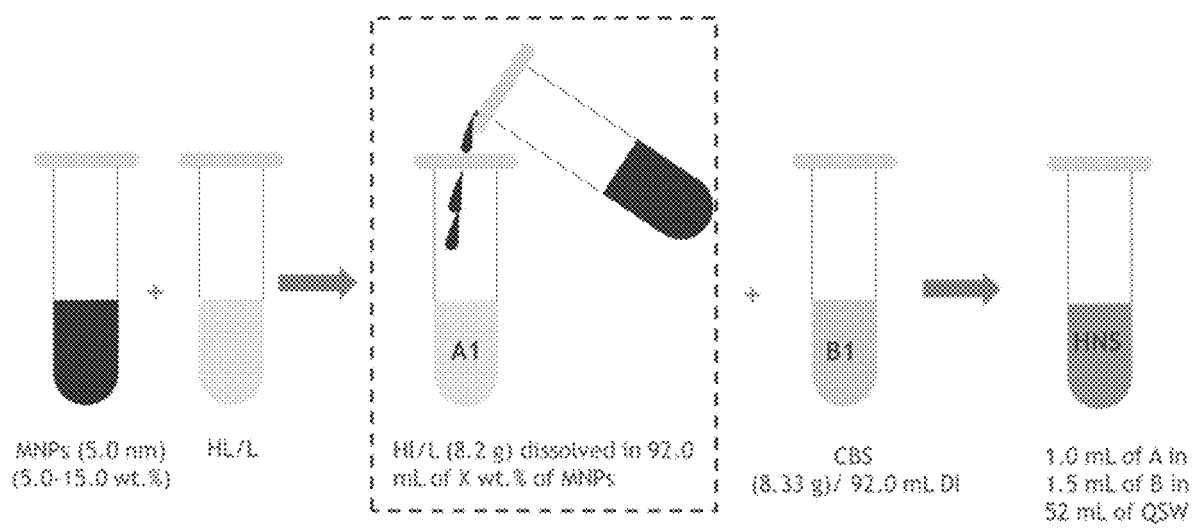
FIGS. 11A-B are schematic representations of the preparation of internally encapsulated hybrid nanosurfactants of one or more embodiments, containing iron nanoparticles having a mean size of 5.0 nm (FIG. 11A) and 10.0 nm (FIG. 11B).
Figure 11B:
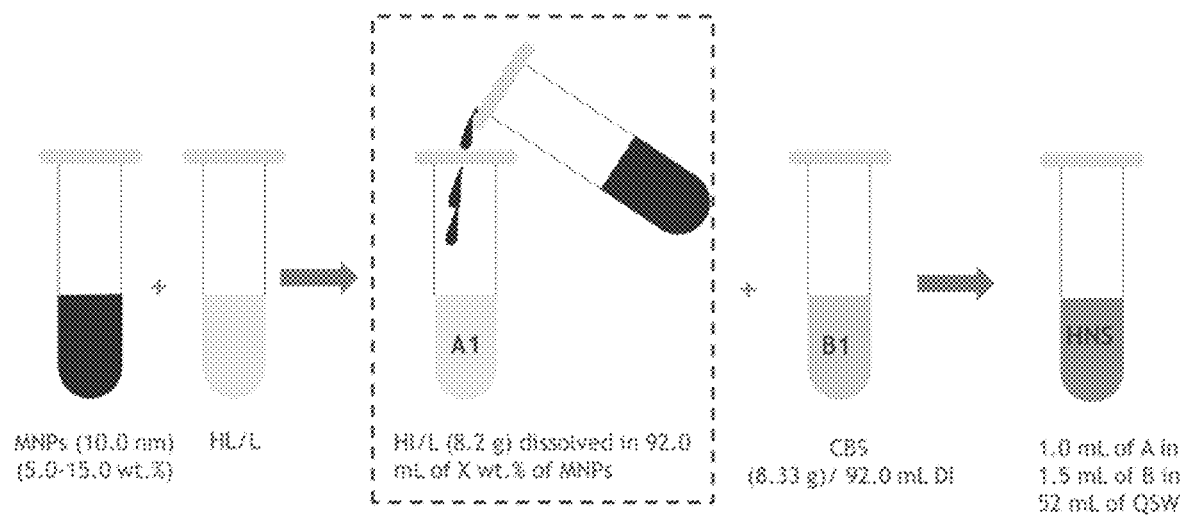
Figure 13A:
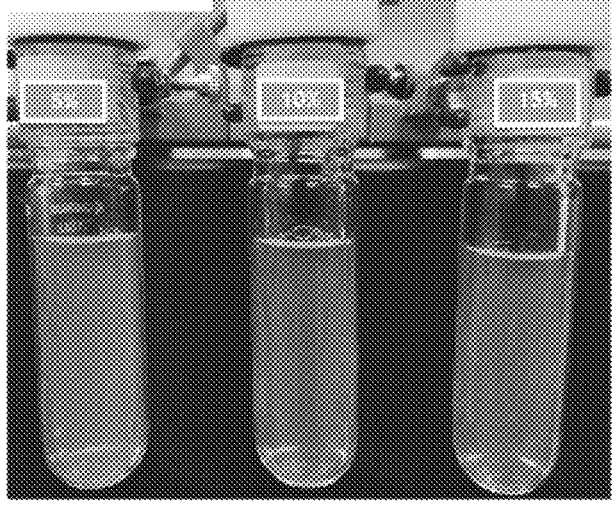
FIGS. 13A-D depict the stability of hybrid nanosurfactant of one or more embodiments, with various concentrations of 5.0 nm iron oxide particles at 90° C. for 0 days (FIG. 13A) and 27 days (FIG. 13B), and 10.0 nm iron oxide particles at 90° C. for 0 days (FIG. 13C) and 27 days (FIG. 13D).
Figure 13B:
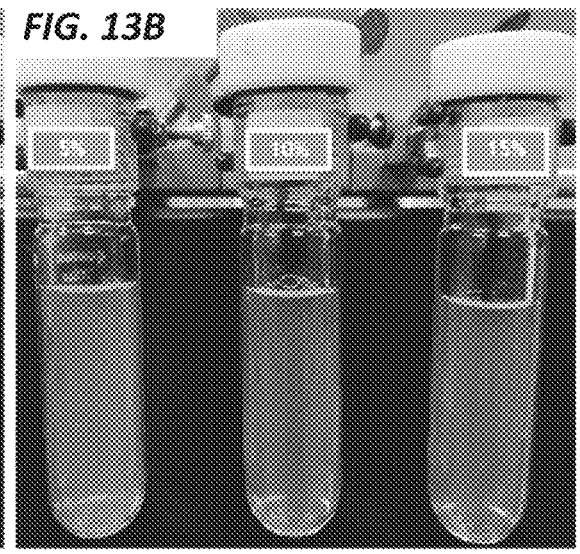
Figure 13C:
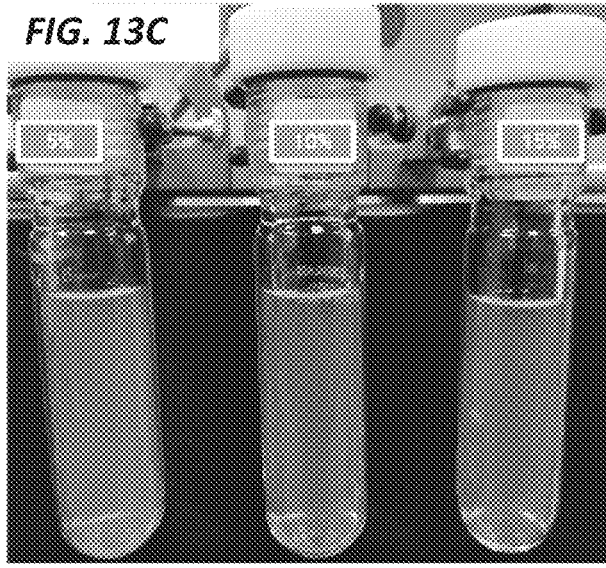
Figure 13D:
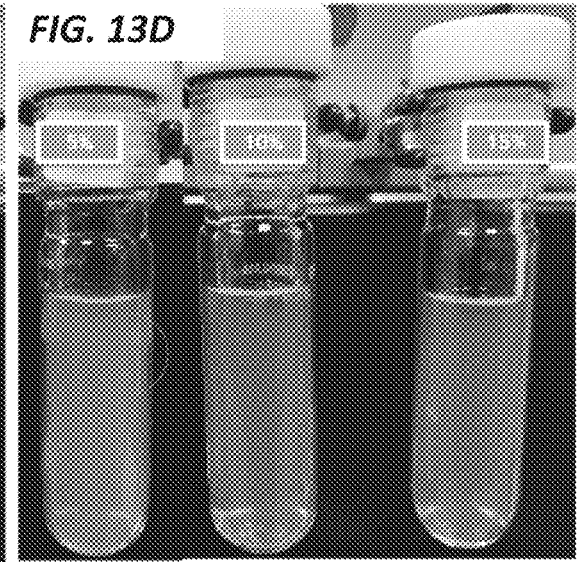

The supermagnetic iron oxide nanoparticles size was reduced from micro-size to nm-size to study the impact of the particle size on the HNS performance. The above mentioned internal encapsulation procedure was repeated using two batches of iron oxide with average particles sizes of 5.0 and 10.0 nm as shown, respectively, in FIGS. 11A-B.

The six formulations were prepared as mentioned above in sealed pressure tubes. The impact of the divalent ions in the sea water on the HNS stability was monitored for 24 h. The results indicated a significant colloidal stability of HNS in the presence of the divalent ions (FIGS. 12A-B).

Figure 14:
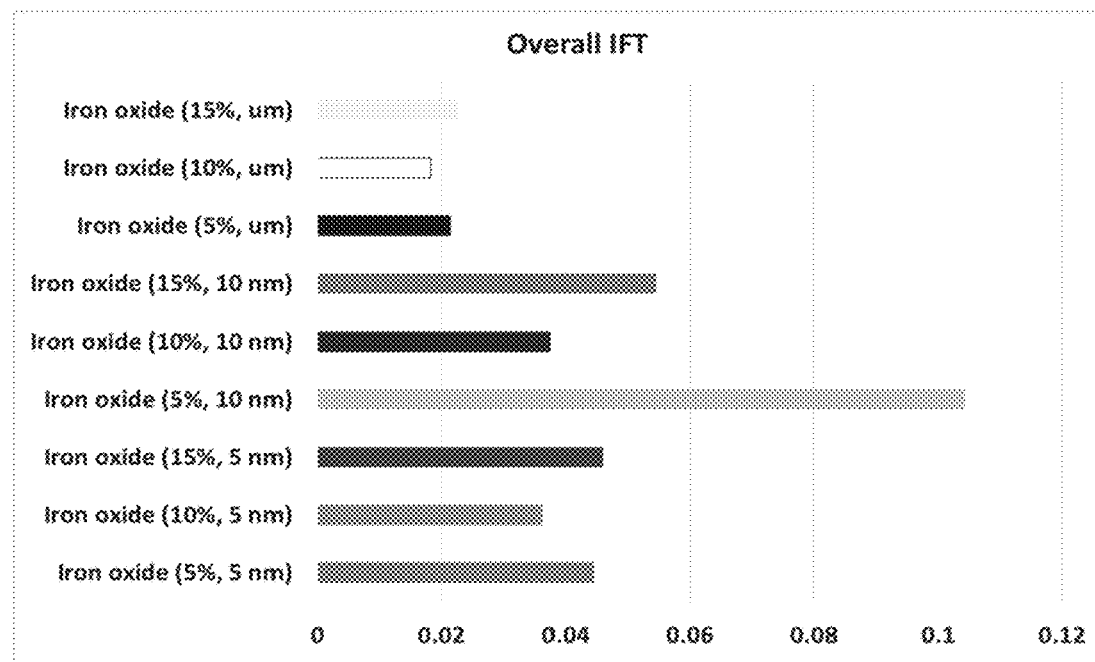
FIG. 14 depicts a graph comparing the interfacial tensions of various hybrid nanosurfactants of one or more embodiments of the present disclosure.

The six pressure tubes were incubated in an oven at 90° C. for stability evaluation. The samples were checked regularly and photographed to monitor and evaluate the colloidal phase behavior under harsh conditions. As shown in FIGS. 13A-D, all the samples exhibited remarkable colloidal stability for a month. The IFT between the HNS and crude oil (UTMN oil) was measured using the same conditions mentioned above. Notably, all the HNSs formulations exhibited IFT values lower than 0.02 mN/m, suggesting great potential for EOR applications (see FIG. 14).

Figure 15A:
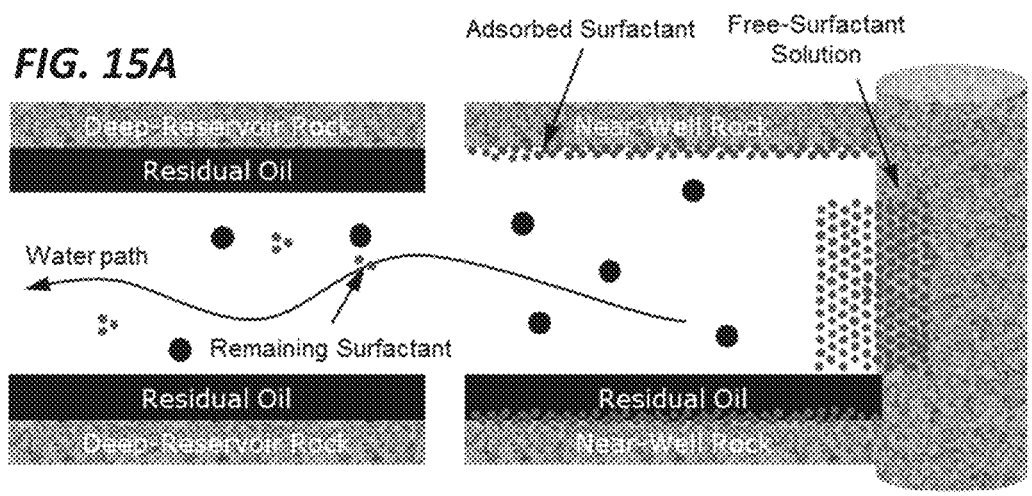
FIGS. 15A-B is a schematic illustration depicting the near wellbore surfactant absorption of a conventional surfactant (FIG. 15A) and a hybrid nanosurfactant of one or more embodiments of the present disclosure (FIG. 15B).
Figure 15B:
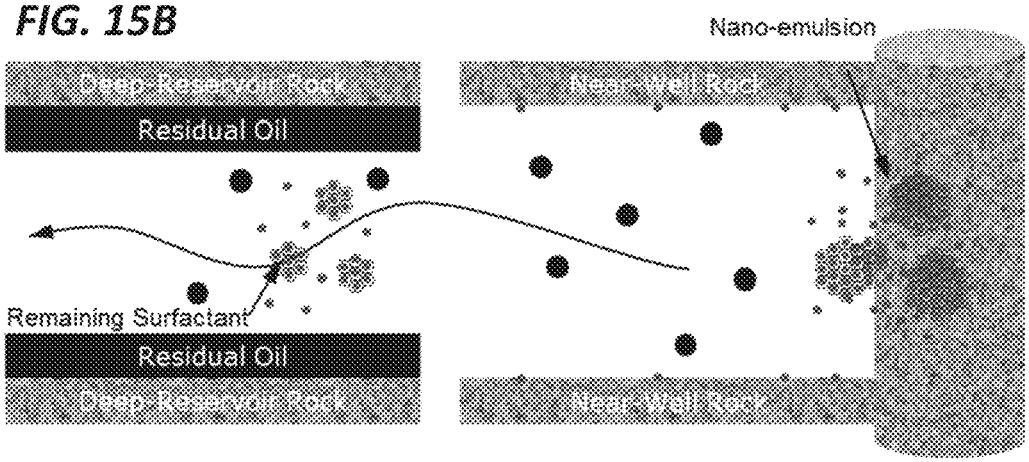

When delivered as part of the HNS composition in EOR operations, the above-demonstrated stability means that the surfactant will be released in the presence of oil, but will otherwise remain intact within the water phase. This approach is efficient and economical in delivering surfactants in targeted oil recovery applications, as the nanoparticles are small enough to readily travel through the reservoir and the absorption of these particles onto the near-well rock matrix may be reduced as compared to conventional surfactants. This is illustrated by FIGS. 15A-B. FIG. 15A depicts that conventional "free" surfactants (that are not a HNS) substantially adsorb in the near-well rock. Therefore, only a small portion are delivered to the residual oil deep in the reservoir. In contrast, and as illustrated by FIG. 15B, the HNS compositions limit rock adsorption, enabling a more efficient delivery of the surfactant to the deep reservoir oil. The compositions are stable for the full duration of their travel time to the oil-water interface.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A hybrid nanosurfactant composition, comprising:
   a core phase comprising a sulfonate surfactant and a first aqueous fluid;
   a shell phase comprising a zwitterionic surfactant encapsulating the core phase;
   a plurality of magnetic particles disposed in the core phase; and
   a second aqueous fluid in which the encapsulated core phase is suspended,
   wherein the hybrid nanosurfactant composition has an interfacial tension (IFT) in crude oil of 0.02 mN/m or less,
   wherein IFT is calculated in accordance with Equation (I):

$$\text{IFT (mN/m)} = 2.78 \times 10^{-16} \pi^2/(8n^3)(\rho_a - \rho_o)\omega D^3 \quad (I)$$

where:
   $\rho_a$ = density of the aqueous phase in grams per cubic centimeters (g/cm)
   $\rho_o$ = density of the oil phase in grams per cubic centimeters (g/cm)
   D = diameter of cylindrical droplet in micrometers
   $\omega$ = rotation speed (rpm), and
   n = refractive index of the aqueous solution.

2. The composition according to claim 1, wherein the plurality of magnetic particles is disposed in the first aqueous fluid.

3. The composition according to claim 2, wherein the plurality of magnetic particles is disposed only in the first aqueous fluid.

4. The composition according to claim 1, wherein the sulfonate surfactant is a petroleum sulfonate.

5. The composition according to claim 1, wherein the magnetic particles are super magnetic iron oxide nanoparticles.

6. The composition according to claim 1, wherein the composition comprises the magnetic particles in an amount in the range of 0.05 to 0.8 wt. %.

7. The composition according to claim 1, wherein the second aqueous fluid has a total dissolved solids content of 30,000 ppm or more.

8. The composition according to claim 1, wherein the first aqueous fluid has a total dissolved solids concentration of 5,000 ppm or less.

9. The composition according to claim 1, wherein the composition contains the sulfonate surfactant in an amount in the range of about 0.03 to 0.2 wt. %.

10. The composition according to claim 1, wherein the composition contains the zwitterionic surfactant in an amount in the range of about 0.03 to 0.2 wt. %.

11. The composition according to claim 1, wherein the composition contains the sulfonate surfactant and the zwitterionic co-surfactant in relative amounts such that a weight ratio of the sulfonate surfactant to the zwitterionic co-surfactant is in the range of 0.5 to 1.0.

12. The composition according to claim 1, wherein the composition contains:
the sulfonate surfactant in an amount in the range of about 0.03 to 0.2 wt. %; and
the magnetic particles in an amount in the range of 0.05 to 0.8 wt. %.

13. The composition according to claim 1, wherein the composition is stable at 90° C. for 30 days or more in the presence of seawater.

14. A method for preparing a hybrid nanosurfactant composition, the method comprising:
mixing magnetic particles with a first portion of a first aqueous fluid to give a first mixture;
adding a sulfonate surfactant to the first mixture to give a core phase solution;
mixing a zwitterionic surfactant with a second portion of the first aqueous fluid to give a shell phase solution; and
mixing together the core phase solution, the shell phase solution, and a second aqueous fluid,
wherein the hybrid nanosurfactant composition has an interfacial tension (IFT) in crude oil of 0.02 mN/m or less, wherein IFT is calculated in accordance with Equation (I):

$$\text{IFT (mN/m)} = 2.78 \times 10^{\wedge}(-16)\pi^2/(8n^3)(\rho_a-\rho_o)\omega D^3 \quad (I)$$

where:
$\rho_a$=density of the aqueous phase in grams per cubic centimeters (g/cm)
$\rho_o$=density of the oil phase in grams per cubic centimeters (g/cm)
D=diameter of cylindrical droplet in micrometers
$\omega$=rotation speed (rpm), and
n=refractive index of the aqueous solution.

15. The method according to claim 14, wherein the first mixture has a concentration of the magnetic particles in the range of 5 to 15 wt. %.

16. The method according to claim 14, wherein the magnetic particles are super magnetic iron oxide nanoparticles.

17. The method according to claim 14, wherein the second aqueous fluid has a total dissolved solids content of 30,000 ppm or more.

18. The method according to claim 14, wherein core phase solution and shell phase solution are mixed in such relative amounts that a weight ratio of the sulfonate surfactant to the zwitterionic co-surfactant is in the range of 0.5 to 1.0.

19. The method according to claim 14, wherein the second aqueous fluid is added in such an amount that the composition contains the sulfonate surfactant in an amount in the range of about 0.03 to 0.2 wt. %.

20. The method according to claim 14, wherein the second aqueous fluid is added in such an amount that the composition contains the zwitterionic surfactant in an amount in the range of about 0.03 to 0.2 wt. %.

21. The method according to claim 14, wherein the sulfonate surfactant is a petroleum sulfonate.

22. The method according to claim 14, wherein the magnetic particles are super magnetic iron oxide nanoparticles.

23. A method for recovering hydrocarbons from a hydrocarbon-containing formation, the method comprising:
injecting into the formation a fluid that comprises a hybrid nanosurfactant composition that contains a core phase containing a sulfonate surfactant, a shell phase containing a zwitterionic co-surfactant, and a plurality of magnetic particles, wherein the hybrid nanosurfactant composition has an interfacial tension (IFT) in crude oil of 0.02 mN/m or less;
displacing hydrocarbons from the formation by forcing the fluid through the formation; and
recovering the hydrocarbons;
wherein IFT is calculated in accordance with Equation (I):

$$\text{IFT (mN/m)} = 2.78 \times 10^{\wedge}(-16)\pi^2/(8n^3)(\rho_a-\rho_o)\omega D^3 \quad (I)$$

where:
$\rho_a$=density of the aqueous phase in grams per cubic centimeters (g/cm)
$\rho_o$=density of the oil phase in grams per cubic centimeters (g/cm)
D=diameter of cylindrical droplet in micrometers
$\omega$=rotation speed (rpm), and
n=refractive index of the aqueous solution.

24. The method according to claim 23, further comprising analyzing the recovered hydrocarbons to determine a concentration of the magnetic particles contained in the hydrocarbons.

25. The method according to claim 24, wherein the hydrocarbons are recovered from the formation at more than one location.

26. The method according to claim 25, further comprising using the analysis of the hydrocarbons to determine a location of the front of the injected fluid in the formation.

27. The method according to claim 24, further comprising using the analysis of the hydrocarbons to determine the mobility of the HNS composition in the formation.

28. The method according to claim 23, wherein the sulfonate surfactant is a petroleum sulfonate.

29. The method according to claim 23, wherein the magnetic particles are super magnetic iron oxide nanoparticles.

30. The method according to claim 23, wherein the magnetic particles are present in the fluid in an amount in the range of 0.05 to 0.8 wt. %.

* * * * *